United States Patent

Breen et al.

[11] Patent Number: 5,240,789
[45] Date of Patent: Aug. 31, 1993

[54] MULTI-LAYER LABELS

[75] Inventors: Thomas J. Breen, Northbrook, Ill.; Jay A. Luft, Nashville, Tenn.

[73] Assignee: Rand McNally & Company, Skokie, Ill.

[21] Appl. No.: 839,337

[22] Filed: Feb. 20, 1992

[51] Int. Cl.⁵ .................................. H07M 2/02
[52] U.S. Cl. .................................. 429/176; 40/626; 40/638
[58] Field of Search .............. 429/176; 283/81, 109, 283/111; 40/626, 638

[56] References Cited

U.S. PATENT DOCUMENTS

| | | | |
|---|---|---|---|
| 2,648,924 | 8/1953 | Brewster | 40/638 |
| 3,854,229 | 12/1974 | Morgan | 40/638 |
| 4,894,106 | 10/1990 | Instance | 283/81 X |
| 4,991,828 | 2/1991 | Cowan et al. | 283/81 |
| 5,032,477 | 7/1991 | Will et al. | 40/638 X |

Primary Examiner—Stephen Kalafut
Attorney, Agent, or Firm—Dressler, Goldsmith, Shore, Sutker & Milnamow, Ltd.

[57] ABSTRACT

A multi-layered corrosion-resistant label comprising a printed layer of a first corrosion-sensitive material, a transparent second layer of a second material different from the printed layer covering the front surface of the printed layer, and being of a shape similar to that of the first layer in plan view and of a second size greater than the first size, a third layer of a material different from the printed layer covering the back surface of the printed layer and being of a shape similar to that of the first shape and of a size greater than the first size, with the second and third layers enveloping the printed layer and providing a protective border surrounding the printed layer so that the peripheral edge of the printed layer is spaced inwardly from the peripheral edges of the second and third layers. A first adhesive layer bonds the second layer to the front surface of the first layer across its surface, a second adhesive layer bonds the inner surface of the third layer to the back surface across its surface, and one of the first and second adhesive layers extends to the peripheral edges of the second and third layers for bonding the second and third layers to each other to define the protective border. A third, pressure-sensitive adhesive layer on the outer surface of the third layer secures the label to the surface of an object, and a release liner covers the third adhesive layer.

21 Claims, 3 Drawing Sheets

MULTI-LAYER LABELS

BACKGROUND OF THE INVENTION

Currently labels affixed to storage batteries, such as of the types used in automobile and trucks. Because of the environment in which batteries are positioned and the fact that battery acid too often contacts the labels, they must be made of expensive materials or suffer a substantial degradation in appearance and useful life.

Furthermore, battery labels are typically die cut from suitable sandwiches of materials. Because the materials of which the sandwiches are made all terminate at the die cut, outer peripheral edges of the materials, exposure to the environment and to battery acid often causes degradation of the internal printed portion of the sandwich, despite the selection and use of expensive materials.

It would be of advantage to provide labels, such as battery labels which do not have the disadvantages of the prior art labels, which make possible the use of less expensive printed label layers, and which do not suffer degradation of the printing and internal layers in the environments in which they are customarily used.

SUMMARY OF THE INVENTION

In accordance with the present invention a corrosion-resistant, multi-layered label, such as one adapted for use on a lead storage battery, is provided. The label comprises a printed layer of a first material bearing selected information on its front surface, the printed layer being of a first shape and size in plan view. A second layer of a second material different from the printed layer is provided. The second layer is transparent so that the selected information may be viewed therethrough. The second layer is of a shape similar to that of the first shape in plan view and is of a second size greater than the first size. A third layer of a material different from the printed layer and covering the back surface of the printed layer is provided. The third layer is of a shape similar to that of the first shape and is of a size greater than the first size.

The second and third layers envelope the printed layer and provide a protective border surrounding the printed layer so that the peripheral edge of the printed layer is spaced inwardly from the peripheral edges of the second and third layers. A first adhesive layer bonds the second layer to the front surface across its surface. A second adhesive layer bonds the inner surface of the third layer to the back surface across its surface. One of the first and second adhesive layers extends to the peripheral edges of the second and third layers for bonding the second and third layers to each other to define the surrounding protective border. A third, pressure-sensitive adhesive layer on the outer surface of the third layer is provided for securing the label to the surface of an object, such as to a battery, and a release liner covers the third adhesive layer prior to securance to an object, such as a battery.

Preferably the first material is a paper material and the second and third layer materials are thin polypropylene layers, the second and third layers having shrink factors of no more than 5%, most preferably shrink factors of no more than 2%, and most desirably are preshrunk. Most desirably the protective border is at least about one-eighth inch and the printed, second and third layers are of a generally rectangular shape.

The label may bear selected information including warranty date information, and may further comprise a plurality of shapes cut into the protective border, with the shapes being spaced away from the peripheral edge of the printed layer and aligned with the date information, so that removal of shapes may be used to signify warranty information.

Further objects, features and advantages of the present invention will become apparent from the following description and drawings.

DETAILED DESCRIPTION

In a preferred form, a battery label of the present invention comprises a multilayered assemblage, including a printed layer, and covering protective layers. The covering protective layers encapsulate and enshroud the printed layer and each extends entirely around the printed layer, providing a surrounding protective border which seals the edges of the printed layer. In one form, the seal is provided by a bonding adhesive. The adhesive may be provided across the surfaces of the printed layer so that the printed layer is adhesively bonded to both of the covering layer across both surfaces.

By so encapsulating and enshrouding the printed layer, relatively inexpensive stock, such as tab stock or even an ordinary paper stock may be used, something which is not possible with currently available die-cut battery labels.

The entire label assembly is adapted to be used in a corrosive environment, such as one which is strongly acidic, and in one in which the temperature may vary, such as from about 0° F. to about 200° F., typical temperature ranges to which battery labels are exposed in testing and use, all without undue degradation, wrinkling or buckling. The label is adapted to be secured to a battery in an appropriate location, as by a self-adhering adhesive. A release liner coated with a conventional silicone release layer may be provided to cover and protect the adhesive until such time as the label is to be secured to a battery.

Battery labels in accordance with the present invention may be made not only to serve as basic identification labels, but also as warranty labels. Use may be made of the surrounding sealed protective border to provide zones which may be removed to identify the year (and month) of purchase, without exposure of the label material to the environment.

Figure 1:
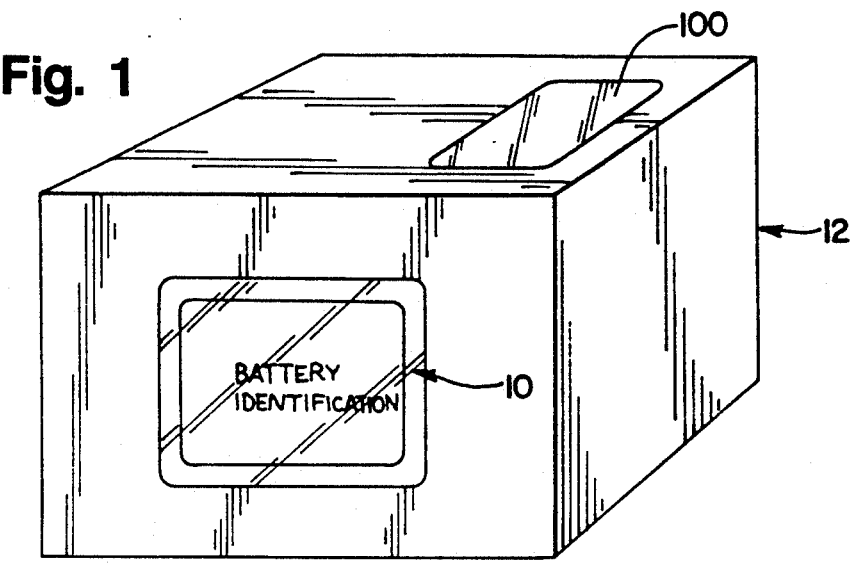
FIG. 1 is a perspective view of a lead storage battery to which battery labels in accordance with the present invention are adhesively secured.
Figure 2:
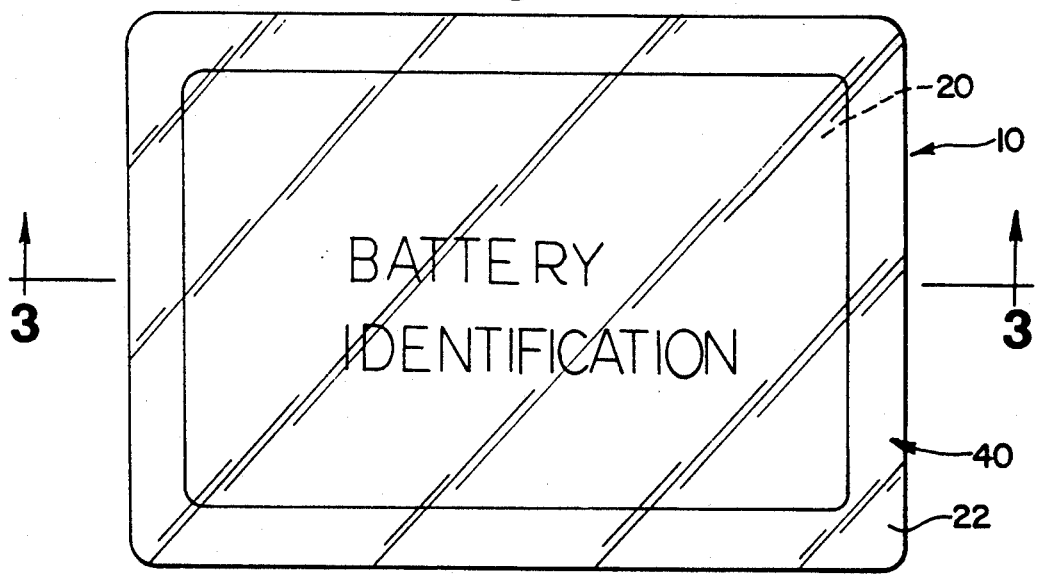
FIG. 2 is a plan view of a battery label of FIG. 1.
Figure 3:
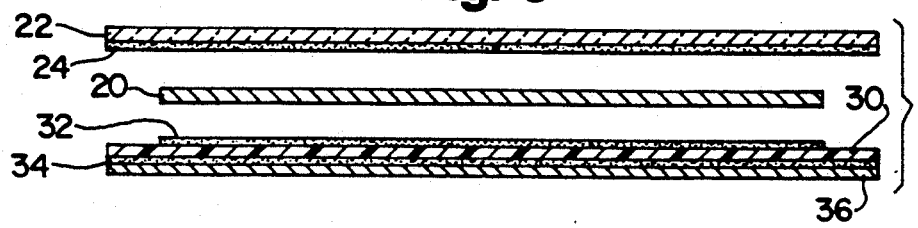
FIG. 3 is a schematic, partially exploded view of a battery label of FIG. 2 taken along line 3—3 of FIG. 2 and including the release liner which removed prior to adherence to the lead storage battery.

Referring now to the drawings, and particularly to FIGS. 1-3, a battery label 10 in accordance with the present invention is structured to be adherable to a lead storage battery 12. Label 10, prior to its adherence to the battery, comprises a first printed layer 20 which is imprinted with and bears selected information, such as a trademark and other selected information on its front surface. Layer 20 is a shape which is generally rectangular in plan view and is of a first selected size, width and height. Label 10 may be a corrosion-sensitive, relatively inexpensive paper or paper tab stock. Preferred papers include coated paper, such as 80 pound one- and two-sided coated paper, and metallized paper. Seven point tab stock may be used as well. Preferred papers have a relatively dense fiber construction. Metallic foils, such as aluminum foils, and other stable imprinted materials may be used as well.

Label 10 further comprises a second layer 22 of a material different from the first layer 20. It is transparent so that the imprinted information is visible and may be viewed therethrough. The second layer covers the front surface of the first layer and is also of a similar generally rectangular shape in plan view. It is of a second size, the width and height of which are each greater than the first width and height, of up to one-quarter inch or more, but preferably being at least about one-eighth inch in each dimension. A preferred material for the second layer is a thermoplastic material such as polypropylene about one to one and one-half mils thick and one having a low shrink factor of no more than 5% in each of the machine and cross-machine directions. Preferably the shrink factor is 2% or less. Most desirably the material is preshrunk.

Label 10 also comprises a third layer 30 which is of a material different from the first layer 20. Layer 30 covers the back surface of the first layer and is also of a similar, generally rectangular shape in plan view. Layer 30 is of a third size, the width and height of which are each greater than the first width and first height, also preferably by at least one-eighth inch in each dimension. A preferred material for the third layer is a thermoplastic material, such as polypropylene about eight-tenths mil thick, having a shrink factor like that of the second layer.

As may be appreciated from the drawings, the second and third layers envelope the first layer and define a protective border 40 surrounding the first layer so that the peripheral edge of the first layer 20 is spaced inwardly from the peripheral edges of the second and third layers. With the dimensions referred to above, the protective border 40 is about one-eighth inch entirely around the first layer 20.

The battery label 10 also includes a number of adhesive layers. A first adhesive layer 24 may be provided preferably across the entire inner surface of the second layer 22. Adhesive layer 24 serves to bond the second layer to the front surface of the first layer across its entire surface. It also serves to bond the second layer 22 and third layer 30 to each other in the zone of the border, and together they define the surrounding protective border 40. The first adhesive layer may preferably comprise a known mild acid-resistant adhesive, such as one available from Flexcon of Spencer, Mass. which is available on a clear biaxially oriented polypropylene film about 1.0 mils thick and which is identified as OP-100-C with V-90 adhesive.

A second adhesive layer 32 serves to secure and bond the first layer 20 thereto, preferably across the entire back surface of the first layer. The second adhesive layer, in the embodiment shown, does not extend into the border zone because, in the embodiment illustrated, such is not necessary. However, it may be desirable to do so under some circumstances. The second adhesive layer may preferably be a stable two-component adhesive which will firmly anchor and bond the polypropylene and paper to each other while still allowing the borders of the paper to be matrix removed during production. A suitable adhesive which tenaciously bonds the first paper 20 layer and polypropylene layer 30 is available from Morton International and is identified as a two-component polyether urethane adhesive. The polyether urethane component is identified as Lamal HSA and the activating component is identified as Coreactant Lamal CR-1-80. Lamal HSA is identified as a polyether urethane having 70% solids in denatured ethanol/hexane. Its viscosity at 25° C. is 8000 cps and it weighs 8.15 pounds per gallon. Lamal Coreactant CR-1-80 is identified as an epoxy resin solution of 80% solids in an ethyl acetate solvent, weighs 9.1 pounds per gallon, has a viscosity of 55 cps and is mixed with Lamal HSA at 10 parts CR-1-80 to 66 parts HSA by weight, with about 24 parts by weight of isopropanol. Other adhesives formulated to tenaciously anchor the layers 20 and 30 to each other may be used as well. Typical temperature ranges to which battery labels may be exposed over repeated temperature cycling, as during testing and use, are from about 0° F. to about 200° F. These are temperatures over which the plastic polypropylene film 22 may tend to grow and shrink versus the paper which is relatively stable dimensionally. Thus the adhesive 32 which is used must anchor layers 20 and 30 to stabilize and stiffen the layer 20 so that delamination of layer 22 does not occur, thereby to minimize the effects of the tendency of the polypropylene to shrink when heated and then cooled.

A final or third adhesive layer 34, which may be a known pressure-sensitive adhesive specially formulated for use in acidic environments, is provided on the outer surface of the third layer 30 for securing the battery label to the battery 12. Prior to the adhesive securance of the label to the battery a conventional release liner 36 is releasably secured to the adhesive layer 34. Release liner 36 is provided with a known release agent, such as a silicone release agent to facilitate its ready removal from the third adhesive layer when the label 10 is to be adhesively secured to battery 12.

Although label 10 has been described as being of a generally rectangular shape and the layers have each been described as being generally rectangular, it is clear that other shapes may be used where desired, understanding, however, that the layers must be so arranged and sized so that a protective border provided by the second and third layers of at least about one-eighth inch or more surrounds the first layer.

It has been determined that labels made in accordance with the present invention, when paper, a porous material, is used as the enveloped layer between generally non-porous thermoplastic layers, sometimes tend to develop areas in which delamination occurs or bubbling appears internally of the label. This tends to occur when the label has been subjected to a substantial increase in temperature over time, usually at least 1 hour, and then is cooled to room or cooler temperatures. These are the conditions batteries (and associated labels) in cars are subjected to. For example, in winter, the engine may heat the battery to 200° when running which is followed by, say, zero degrees when engine is off. The bubbling is most evident when the label is at least about 3 to 4 inches in each direction. The problem has been alleviated in such labels, particularly when they are 3 to 4 inches or more in one direction and greater than that in the other direction when the layers 20 and 30 are firmly adhered and anchored, as described above, so that the layer 20 is effectively rigidified and when other steps are taken as well. When such is done, deformation resulting from temperature cycling of the layer 22 and layer 20 is minimized.

In this regard it should be understood that commonly available plastic sheeting such as polypropylene, tends to shrink by up to 10% or more in the machine direction, and less in the cross machine direction. Even preshrunk and cast polypropylene (as distinguished from extruded polypropylene) has a shrink factor of from about 2 to about 5%. After permanent and temporary shrinking due to heating, it appears that some expansion will occur after the sheeting is returned to ambient temperature from an elevated temperature. Thus where service or testing results in substantial temperature swings, such as with automobile battery labels, the results of temperature cycling tends to induce stresses and to result in disturbance of the multi-ply labels produced in accordance with this invention especially when they are three to four inches or more in one dimension and more than that in the other dimension. The paper tends to be dimensionally stable for the same temperature, i.e., about 0° F. to 200° F.

In test situations the shrinking of the polypropylene sheeting is evidenced by a slight shrinkage of the label in its border area despite adhesion to the base, such as a battery, namely by the top layer shrinking inwardly very slightly relative to the bottom layer which is adhered to the base. It appears that the adhesion of the bottom layer to the base retards shrinkage of that layer to some extent.

Shrinkage induces a variety of stresses in a label in use. The shrinkage in the top layer is in the plane of the film in both the machine and cross-machine directions which may for convenience be referred to the X and Y directions. These forces act against the paper tending to cause it to deform or buckle in a direction perpendicular to the plane of the top layer and adhered paper, a direction which may be referred to as the Z direction. The tendency to deformation in the Z direction is, however, resisted by the overlap in the border area of the strongly adhered top and bottom layers and adherence of the label to the battery. These and the paper itself all contribute to resisting the strong X and Y forces in the top sheet and their tendency to cause the paper to move in the Z direction. That this is so is supported by the fact that a label which is heated to high temperatures (causing shrinkage) remains flat, that it deforms when cooled, and that when it is heated gain to high temperatures it flattens again. From this it can only be concluded that the X and Y tension and tautness forces are resisting movement in the Z direction.

It has also been observed that there are two stages of shrinkage which a label may go through as it is cooled, say from a temperature of 200° F. to ambient temperature. In the first stage which occurs after a few minutes and after a temperature drop of 10° F. to 20° F., bubbles or mounds appear in the central area of the paper. This appears to be because the paper and top layer separate locally from the bottom layer and is believed to result from the expansion at the lower temperature of the upper layer and decreases in the forces in the X and Y directions. As such the possibility of Z dimension deformation of the paper increases. Because the adhesion between the bottom layer and the paper is always weakest and during heating may have failed locally, the paper and the top layer tend to pop-up (deform in the Z direction) in mounds which may be as large as a quarter or larger in size. It appears that this first stage shrinkage is due to relaxation of the temporary shrink and partial or complete adhesive failure.

In the second stage of cooling during which the label cools further, eventually reaching room temperature, a phenomenon which may be referred to as ridging occurs. Ridging is a Z direction deformation caused by the permanent portion of the shrinkage, principally in the top layer and principally shrinkage in the X or machine direction. Ridging is observed as a slight upward curling of the outer edges of the paper layer producing an increase in the Z dimension of the label in the zone of the paper edge. It also appears that a portion of the top layer immediately adjacent the paper edge moves inwardly like a wedge, as it were, between the bottom layer and the paper edge (due to shrinkage and due to the X and Y direction forces) to lift the paper edge. This tends to be more pronounced at the edges perpendicular to the machine direction of the upper layer.

Ridging may also appear as a phenomenon inwardly of the edges of the paper. This is most noticeable when the paper is weak and the adhesive bond between the paper and the bottom layer is weak. In such a case, the top layer, as it shrinks in the X and Y directions, causes adjacent zones of the paper which are not restrained by adhesive to tend to move towards each other resulting in upward buckling of the paper in the Z direction. The effects of shrinkage of the top layer in such circumstances may also sometimes appear as bubbles or mounds instead of as ridges.

It has been determined that the effects of shrinkage and the potentiality for problems of the type just referred to in labels made in accordance with the present invention may be minimized by careful consideration of a number of factors. Of course, it is important to use plastic film layers which are most stable, and which shrink the least. Thus cast preshrunk polypropylene is preferred for use. In any event polypropylene having a shrink factor of less than 5% or even less than 2% is preferred. Common commercially available extruded polypropylene is less likely to produce large labels which are suitably stable (unless substantially preshrunk versions become available). In this regard care in avoiding mechanical stretching of the top and bottom layers, and especially the top layer, during manufacture should be minimized to the extent possible thereby to minimize shrinking in the X direction when the label is heated.

Further, stiffer and stronger paper layers are more likely to perform better and to resist mounding and ridging, except that even they are still subject to edge ridging. Although stiffer papers such as tab stock are preferred for this reason, from a printing and graphics standpoint metallized papers and paper such as 80 pound coated one-side papers with the uncoated side down to improve bonding with the bottom layer are preferred overall. Additionally, the more effective the adhesive bond between the paper and the bottom layer, the less likely it is that mounding and ridging will occur.

With the use of a strong, tenacious adhesive as described above, the tendency to production of stage one mounds virtually disappears. However, ridging, primarily at the edges, is not cured entirely, even by a tenacious adhesive bond between the paper and bottom layer in larger sized labels.

The phenomena resulting from the tendency of the plastic films to shrink become more noticeable, everything else being equal, when the labels exceed dimensions of three to four inches, and especially when they are three to four inches in one direction and more than that by a factor of fifty percent or more in their other dimension. Especially in those cases, particularly because shrinkage is typically two to three times greater in the machine direction than in the cross-machine direction, it is highly desirable to dispose the paper between the top and bottom layers with the shorter dimension of the paper parallel to the machine direction of the plastic film and preferably also with the machine direction of the paper running in the machine direction of the plastic layers. These reduce the tendency of the labels to ridging and mounding. It also appears that edge lift and ridges in the Z dimension tend to be somewhat less when there is a relatively wider border relative to the paper dimensions. For labels of dimensions such as 3"×6", 3"×7", 4"×7" with borders of about one-quarter inch, all of the features referred to as diminishing the tendency towards mounding and ridging are desirably employed. For labels which are smaller, such as three by three inches or less, special adhesives and grain direction selection may not be as important in avoiding excessive stage one and stage two deformations.

Figure 4:
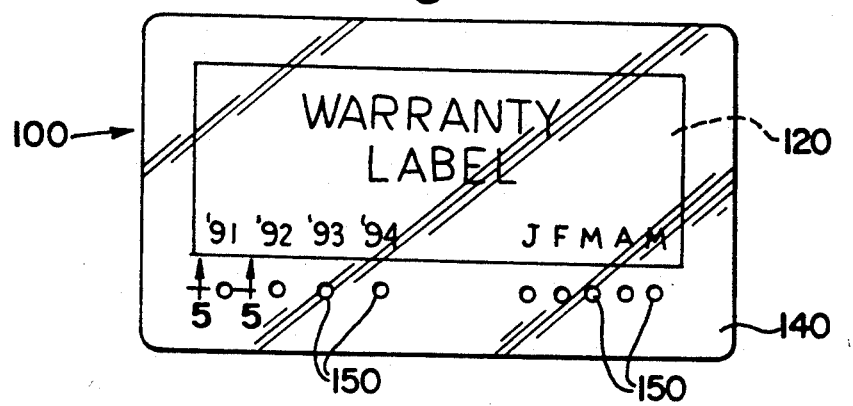
FIG. 4 is a plan view of a battery label of FIG. 1.
Figure 5:
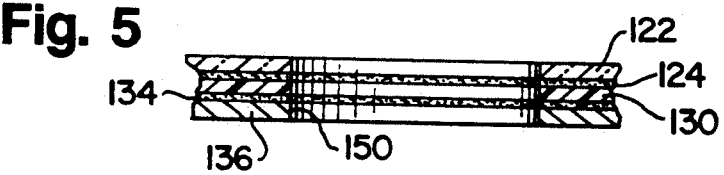
FIG. 5 is a schematic cross-section view taken along line 5—5 of FIG. 4.

Referring now to FIGS. 4 and 5, a battery label 100 is identical in construction and materials to that of battery label 10 and is adhesively securable to a battery 12 in exactly the same manner as is label 10. Like label 10 which has a protective border 40 surrounding the printed layer 20, label 100 has a protective border 140 surrounding printed layer 120. Border 140 is preferably of at least about one-eighth inch around the printed layer 120 on three sides, and is of a larger dimension, such as one-half inch or more on one side.

As shown by FIG. 4, printed layer 120 provides selected warranty information which may be of a conventional type, such as references to years and months. The border 140, in addition to serving as the protective border, also defines a plurality of shapes which are spaced inwardly of the edge of the label and outwardly of the adjacent peripheral edge of the printed layer 120. Preferably the shapes are aligned with the selected warranty information and are cut into and through the protective border (as by die cutting), so that desired ones of the shapes may be removed to provide the desired selected warranty information.

The border 140 defining the shapes 150, like label 10, comprises a second layer 122 and a third layer 130 which are sealingly bonded to each other by an adhesive layer 124, as well as pressure-sensitive adhesive layer 134 and a protective release liner 136.

Figure 6:
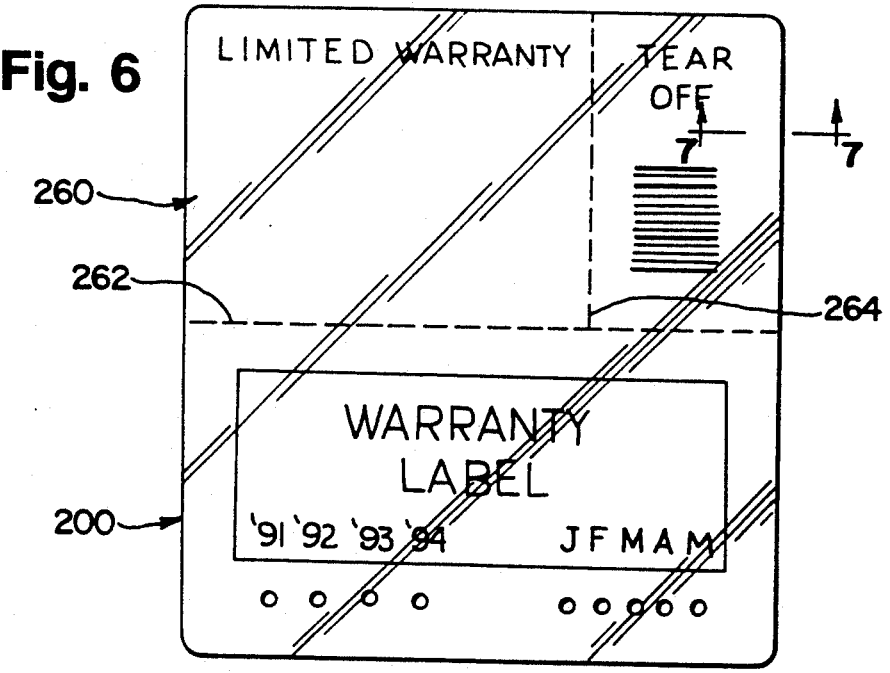
FIG. 6 is a plan view of a further battery label of the present invention.
Figure 7:
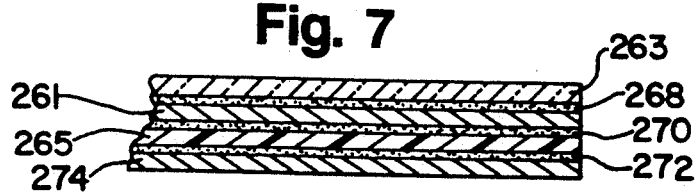
FIG. 7 is a cross-sectional view taken along line 7—7 of FIG. 6.

FIGS. 6 and 7 show another warranty label employing the principles of the present invention. In this form of the invention the warranty label 200 is identical to that of FIGS. 4 and 5. It is, however, secured to a tear-off warranty disclosure section 260 along a line of perforations 262. The section 260 may be divided into two portions separable along a second line of perforations 264. The section 260, because it is to be removed from label 200, need not be provided with a protective border. As such, the section 260 may comprise a first printed layer 261, second and third layers 263 and 265, first and second adhesive layers 268 and 270 each of which extends to the border, a pressure sensitive adhesive layer 272 and a protective, removable liner 274. These may be of the same materials described in connection with the construction of label 10.

Figure 8:
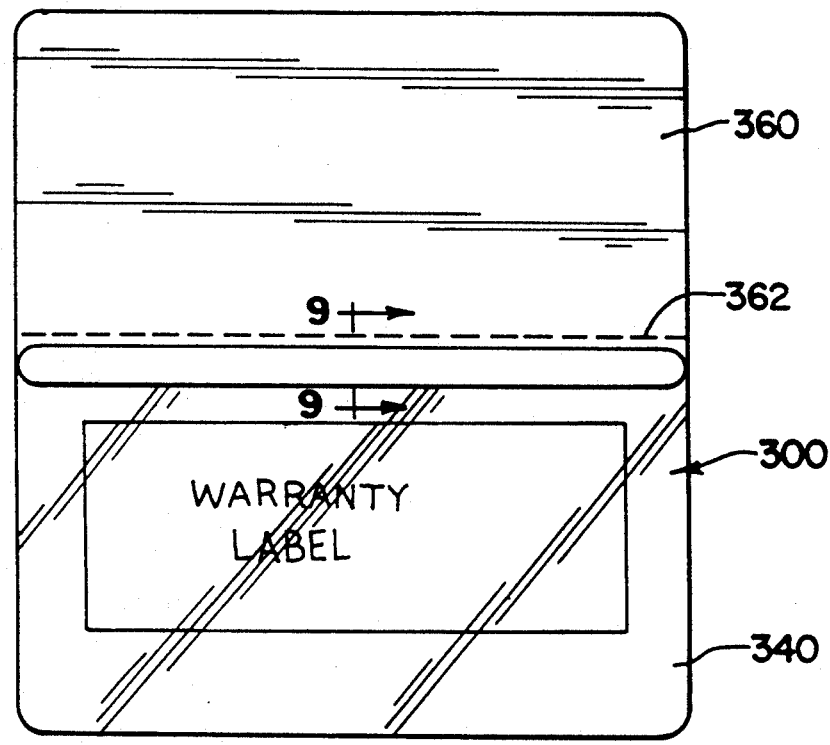
FIG. 8 is a plan view of a further battery label of the present invention.
Figure 9:
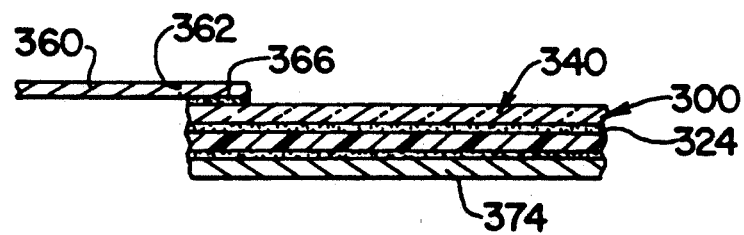
FIG. 9 is an enlarged schematic cross-sectional view taken substantially along line 9—9 of FIG. 8.

Referring now to FIGS. 8 and 9, a further battery label 300 associated with a removable warranty disclosure section 360 is there shown. The warranty label 300 may comprise a label the same as label 100, with the addition of a warranty section 360. Warranty section 360 may be of printed paper, one marginal edge of which is adhered via an adhesive zone 366 to secure it to the label in t-he zone of the border 340 defined by layers 322 and 330 as secured by adhesive 324. To make the warranty section removable, a line of perforations 362 may be provided in the warranty section adjacent to border 340. In that case, a narrow strip of the warranty section will be left when the main body of warranty section 360 is removed. In this embodiment, a removable protective liner 374 is provided, just like in the embodiment of FIG. 4.

The labels described are both acid-resistant and suitably resistant over a range of temperatures, typically at present a range of about 0° F. to about 200° F., and therefore are well-suited for use as battery labels. The labels are also well-suited for use in other environments where substantial temperature changes are not a primary concern, but where resistance to degradation due to environmental conditions, such as caustic and acidic environments to which barrels and drums may be exposed, is a concern.

It will be apparent to those skilled in the art that modifications of and changes in the embodiments described and illustrated may be made without departing from the spirit and scope of the present invention. For example, other suitable adhesives and other enshrouding transparent layers than polypropylene which are corrosion and acid-resistant or which are resistant to degradation because of hostile or adverse environmental conditions or which are otherwise suitable for selected applications may be used, as may other enveloped materials be used, and other arrangements and shapes may be used as well. Accordingly, it is intended that the invention should not be deemed to be limited by the specific embodiments described.

What is claimed is:

1. A lead storage battery having a multilayered label adhesively secured thereto, said label comprising
    a pre-printed layer of a first sheet material and bearing selected information on its front surface, said printed layer being of a first shape and size in plan view;
    a second layer of a second material different from the printed layer and covering the front surface of said printed layer, said second layer being a transparent plastic film so that the selected information may be viewed therethrough, said second layer being of a shape like that of the first shape in plan view and being of a second size greater than the first size;
    a third layer of a material different from the printed layer and covering the back surface of said printed layer, said third layer being a transparent plastic film of a shape like that of the first shape and being of a size greater than the first size;
    said second and third layers enveloping said printed layer and providing a protective border surrounding said printed layer so that the peripheral edge of said printed layer is spaced inwardly from the peripheral edges of said second and third layers;
a first adhesive layer permanently bonding said second layer to said front surface across its surface;
a second adhesive layer permanently bonding the inner surface of said third layer to the back surface across its surface;
one of said first and second adhesive layers extending to the peripheral edges of the second and third layers for bonding said second and third layers to each other to define and make permanent said surrounding protective border; and
a third, pressure-sensitive adhesive layer on the outer surface of said third layer securing the battery label to said battery.

2. The lead storage battery having a label in accordance with claim 1, and wherein said first material is a paper material.

3. The lead storage battery having a label in accordance with claim 2, and wherein said second and third layer materials are polypropylene.

4. The lead storage battery having a label in accordance with claim 3, and wherein said second material is polypropylene having a shrink factor of no more than about 5%.

5. The lead storage battery having a label in accordance with claim 1, and wherein said first material is other than paper.

6. The lead storage battery having a label in accordance with claim 5, and wherein said first material is a metallic foil.

7. The lead storage battery having a label in accordance with claim 1, and wherein said selected information includes warranty date information, and further comprising a plurality of shapes cut into said protective border, said shapes being spaced away from the peripheral edge of said printed layer and aligned with said date information, so that removal of shapes may be used to signify warranty information.

8. The lead storage battery having a label in accordance with claim 1, and wherein said protective border is at least about one-eighth inch.

9. The lead storage battery having a label in accordance with claim 1, and wherein said printed, second and third layers are of a generally rectangular shape.

10. A multi-layered label which is resistant to degradation comprising:
a pre-printed layer of a first sheet material and bearing selected information on its front surface, said printed layer being of a first shape and size in plan view;
a second layer of a second material different from the printed layer and covering the front surface of said printed layer, said second layer being a transparent plastic film so that the selected information may be viewed therethrough, said second layer being of a shape like that of the first shape in plan view and being of a second size greater than the first size;
a third layer of a material different from the printed layer and covering the back surface of said printed layer, said third layer being a transparent plastic film of a shape like that of the first shape and being of a size greater than the first size;
said second and third layers enveloping said printed layer and providing a protective border surrounding said printed layer so that the peripheral edge of said printed layer is spaced inwardly from the peripheral edges of said second and third layers;
a first adhesive layer permanently bonding said second layer to said front surface across its surface;
a second adhesive layer permanently bonding the inner surface of said third layer to the back surface across its surface;
ones of said first and second adhesive layers extending to the peripheral edges of the second and third layers for bonding said second and third layers to each other to define and make permanent said surrounding protective border;
a third, pressure-sensitive adhesive layer on the outer surface of said third layer for securing the label to the surface of an object; and
a release liner covering said third adhesive layer.

11. The multi-layered label in accordance with claim 10, and wherein said first material is a paper material.

12. The multi-layered label in accordance with claim 10, and wherein said second and third layer materials are polypropylene.

13. The multi-layered label in accordance with claim 12, and wherein both said second and third materials have a shrink factor of no more than about 5%.

14. The multi-layered label in accordance with claim 10, and wherein said first material is a metallic foil.

15. The multi-layered label in accordance with claim 10, and further comprising a plurality of shapes cut into said protective border, said shapes being spaced away from the peripheral edge of said printed layer, so that removal of shapes may be used to signify desired information.

16. The multi-layered label in accordance with claim 10, and wherein said protective border is at least about one-eighth inch.

17. The multi-layered label in accordance with claim 10, and wherein said printed, second and third layers are of a generally rectangular shape.

18. A generally rectangular multi-layered label resistant to adverse ambient environmental conditions comprising:
a pre-printed layer of a first sheet material and bearing selected information on its front surface, said printed layer being of a first shape and size in plan view;
a second layer of a second material different from the printed layer and covering the front surface of said printed layer, said second layer being a thermoplastic film material having a shrink factor of 5% or less and being transparent so that the selected information may be viewed therethrough, said second layer being of a shape like that of the first shape in plan view and being of a second size greater than the first size;
a third layer of a thermoplastic material film different from the printed layer and covering the back surface of said printed layer, said third layer having a shrink factor of 5% or less and being of a shape similar to that of the first shape and being of a size greater than the first size;
said second and third layers enveloping said printed layer and providing a protective border of at least about one-eighth inch surrounding said printed layer so that the peripheral edge of said printed layer is spaced inwardly from the peripheral edges of said second and third layers;
a first adhesive layer permanently bonding said second layer to said front surface across its surface;

a second adhesive layer permanently bonding the inner surface of said third layer to the back surface across its surface;

one of said first and second adhesive layers extending to the peripheral edges of the second and third layers for bonding said second and third layers to each other to define and make permanent said surrounding protective border;

a third, pressure-sensitive adhesive layer on the outer surface of said third layer for securing the label to the surface of an object; and a release liner covering said third adhesive layer.

19. The multi-layered label in accordance with claim 18, and wherein said first material is a paper material.

20. The multi-layered label in accordance with claim 19, and wherein said thermoplastic material is polypropylene.

21. The multi-layered label in accordance with claim 18, and wherein said first material is a metallic foil.

* * * * *